United States Patent
Lamerton et al.

(10) Patent No.: US 11,958,657 B2
(45) Date of Patent: Apr. 16, 2024

(54) MAGAZINES FOR HOLDING PLURAL FLAT CARDS

(71) Applicant: QIAGEN Healthcare Biotechnologies Systems GmbH, Hilden (DE)

(72) Inventors: Kathryn Louise Lamerton, South Wales (GB); Michael John Smith, South Wales (GB); Phillip Evans, South Wales (GB); Kristina Swann, South Wales (GB)

(73) Assignee: QIAGEN HEALTHCARE BIOTECHNOLOGIES SYSTEMS GmbH, Hilden (DE)

( * ) Notice: Subject to any disclaimer, the term of this patent is extended or adjusted under 35 U.S.C. 154(b) by 1234 days.

(21) Appl. No.: 16/499,504

(22) PCT Filed: Mar. 28, 2018

(86) PCT No.: PCT/EP2018/058020
§ 371 (c)(1),
(2) Date: Sep. 30, 2019

(87) PCT Pub. No.: WO2018/178204
PCT Pub. Date: Oct. 4, 2018

(65) Prior Publication Data
US 2020/0039693 A1 Feb. 6, 2020

(30) Foreign Application Priority Data
Mar. 31, 2017 (GB) ...................................... 1705176

(51) Int. Cl.
*B65D 25/10* (2006.01)
*B01L 9/00* (2006.01)
*G01N 35/00* (2006.01)

(52) U.S. Cl.
CPC .............. *B65D 25/107* (2013.01); *B01L 9/52* (2013.01); *G01N 35/00029* (2013.01);
(Continued)

(58) Field of Classification Search
CPC ........ B01L 3/508; B01L 3/50853; B01L 9/52; B01L 9/523; B01L 9/527;
(Continued)

(56) References Cited

U.S. PATENT DOCUMENTS 3,027,666 A * 4/1962 Briskin .................. G03B 23/04
206/559
3,584,738 A * 6/1971 Wallace ............... B65D 25/107
220/23.6

(Continued)

FOREIGN PATENT DOCUMENTS

EP 0621196 A1 10/1994
JP H0864667 A 3/1996

OTHER PUBLICATIONS

International Search Report in PCT/EP2018/058020, dated Jun. 13, 2018.

Primary Examiner — Gideon R Weinerth
(74) Attorney, Agent, or Firm — MEDLER FERRO WOODHOUSE & MILLS PLLC

(57) ABSTRACT

Disclosed is a lidded magazine (100) for holding plural generally flat sample collection cards (10) in spaced parallel relation, the magazine is open at its top and includes upstanding opposed side walls (110,120), each wall (110, 120) further including plural opposed pairs of inwardly extending wall ribs (112,122) spaced along each wall (110, 120) to provide therebetween card accepting slots, a first slot dimension (W) being defined by the spacing between an interior face (154) of each wall, the magazine being characterised in that the walls (110,120) at the top (152) of each (Continued)

slot (150) are tapered outwardly such that the first dimension (W) is greatest at the top of the slot (150).

16 Claims, 3 Drawing Sheets

(52) U.S. Cl.
CPC . *B01L 2200/025* (2013.01); *B01L 2300/0861* (2013.01); *G01N 2035/00089* (2013.01); *G01N 2035/00148* (2013.01)

(58) Field of Classification Search
CPC ....... B01L 2200/025; B01L 2300/0861; B01L 2300/0822; B42F 7/10; B42F 7/12; B42F 7/08; B42F 17/02; B65D 25/107; B65D 85/48; B65D 85/62; G01N 35/00029; G01N 35/0418; G01N 35/0401; G01N 2035/00089; G01N 2035/00148
USPC ...... 73/864.91; 422/561, 563; 206/564, 449, 206/455, 456
See application file for complete search history.

(56) References Cited

U.S. PATENT DOCUMENTS

| | | | | |
|---|---|---|---|---|
| 4,138,172 A | * | 2/1979 | Hansen | B42F 17/02 312/184 |
| 4,234,089 A | * | 11/1980 | Morris | B65D 25/06 220/532 |
| 4,782,942 A | * | 11/1988 | Ashley | A61L 2/26 206/5.1 |
| 4,782,949 A | * | 11/1988 | Berkman | G11B 23/0236 312/9.54 |
| 4,935,208 A | * | 6/1990 | Kohler | G01N 33/54366 422/310 |
| 4,975,250 A | | 12/1990 | Mordecki | |
| 4,986,414 A | * | 1/1991 | Ashley | B65D 55/02 206/5.1 |
| 5,021,218 A | * | 6/1991 | Davis | B01L 9/52 206/456 |
| 5,299,688 A | * | 4/1994 | McKay | A45C 11/18 206/425 |
| D380,639 S | * | 7/1997 | Tisbo | D6/629 |
| 8,006,842 B1 | * | 8/2011 | Loughlin, Jr. | B65D 21/0216 206/509 |
| 8,454,909 B2 | * | 6/2013 | Martinell Gispert-Sauch | B01L 9/52 422/561 |
| D697,223 S | * | 1/2014 | Smith | B01L 3/5085 D24/216 |
| D707,846 S | * | 6/2014 | Smith | D24/227 |
| D715,960 S | * | 10/2014 | Smith | B01L 9/52 D24/227 |
| D715,961 S | * | 10/2014 | Smith | B65D 55/02 D24/227 |
| D871,611 S | * | 12/2019 | Lamerton | A61L 2/26 D24/229 |
| 2002/0088736 A1 | * | 7/2002 | Liu | B65D 25/107 206/526 |
| 2003/0089634 A1 | | 5/2003 | Mason et al. | |
| 2003/0168458 A1 | * | 9/2003 | Lafferty | B01L 3/5085 220/523 |
| 2003/0226781 A1 | | 12/2003 | Liao | |
| 2005/0006266 A1 | * | 1/2005 | Kurikawa | G03F 1/66 430/4 |
| 2005/0087470 A1 | * | 4/2005 | Chuang | B65D 25/107 206/499 |
| 2008/0098830 A1 | * | 5/2008 | Martinell Gispert-Sauch | B01L 9/52 73/864.91 |
| 2010/0083777 A1 | | 4/2010 | Walter et al. | |
| 2011/0268630 A1 | * | 11/2011 | Williams | B01L 3/5085 422/560 |
| 2013/0260477 A1 | * | 10/2013 | Smith | B01L 3/508 422/547 |
| 2014/0093425 A1 | | 4/2014 | Ohmae | |
| 2014/0154686 A1 | * | 6/2014 | Horton | B01L 3/5055 435/7.1 |
| 2014/0298926 A1 | * | 10/2014 | Kenrick | G01N 35/00029 73/864.91 |
| 2020/0039693 A1 | * | 2/2020 | Lamerton | B01L 9/52 |
| 2021/0268494 A1 | * | 9/2021 | Graham | B01L 9/52 |
| 2022/0161968 A1 | * | 5/2022 | Lavrykova-Marrain | B01L 3/50853 |
| 2022/0225968 A1 | * | 7/2022 | Hughes | C12M 1/16 |
| 2023/0339652 A1 | * | 10/2023 | Yun | B65D 25/107 |

* cited by examiner

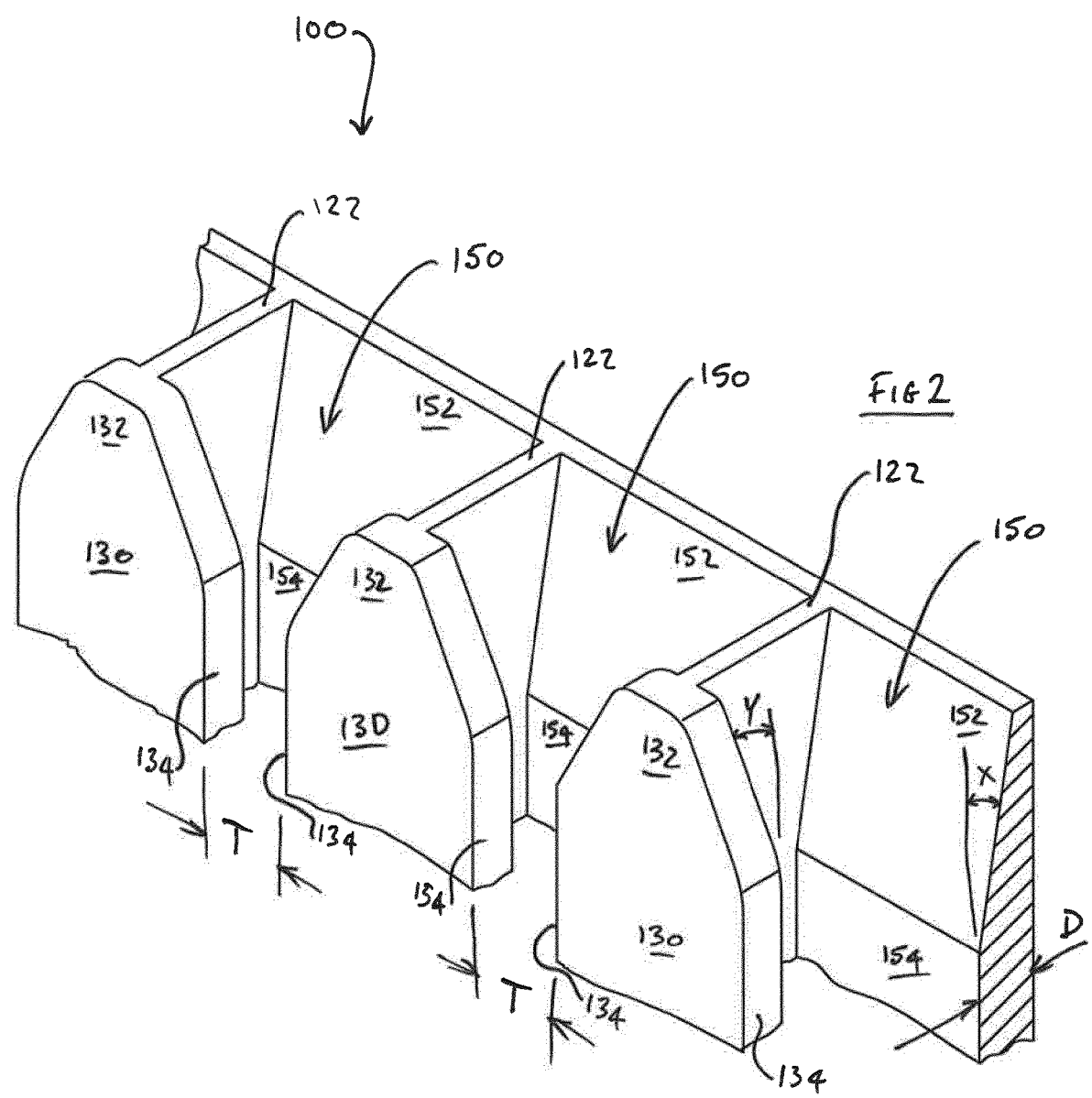

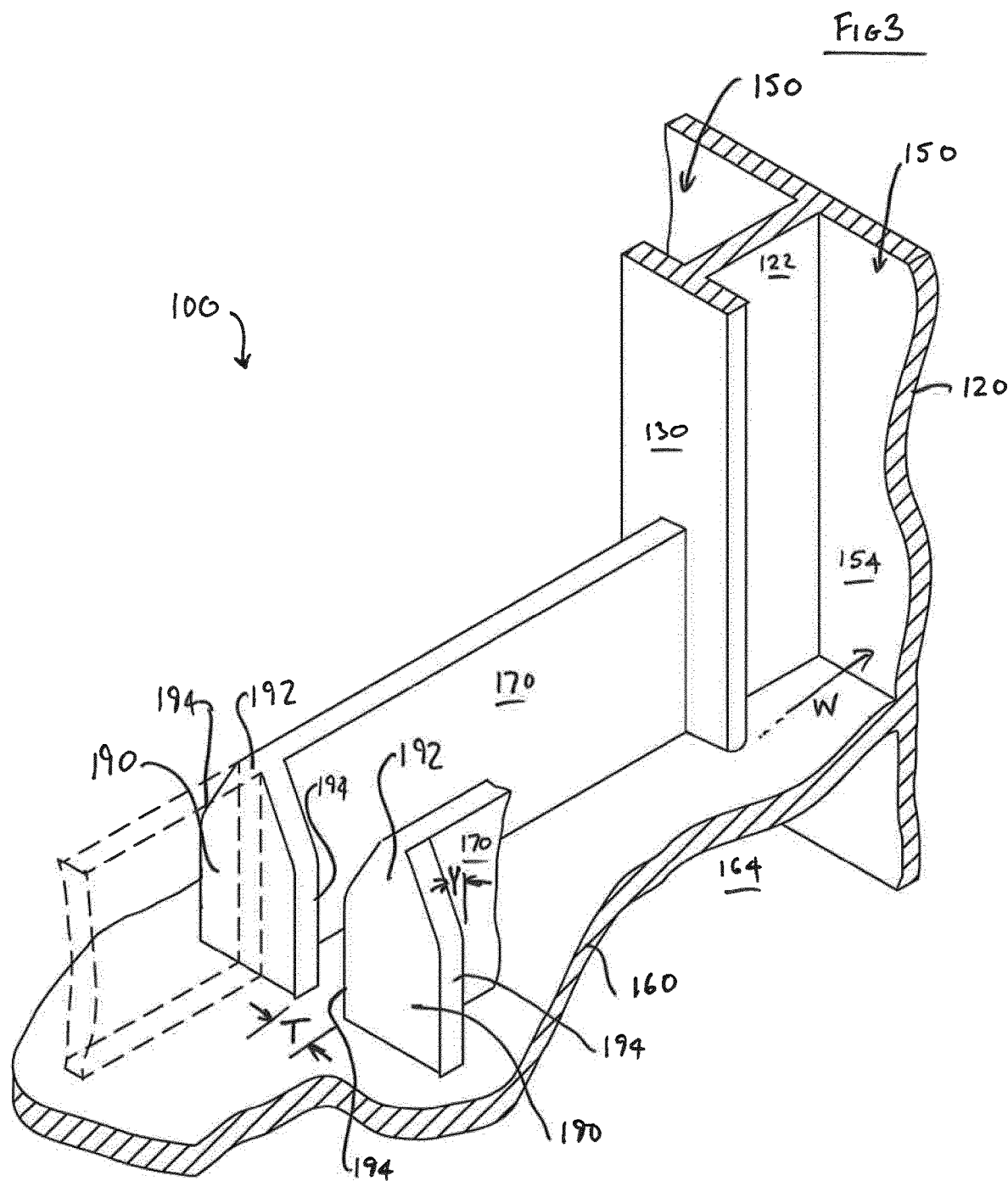

US 11,958,657 B2

MAGAZINES FOR HOLDING PLURAL FLAT CARDS

FIELD OF THE INVENTION

The present invention relates to magazines for holding plural flat cards and the like in a generally parallel manner, particularly but exclusively in the field of forensics or diagnostics where such cards are intended to hold biological material collected for genetic profiling.

BACKGROUND OF THE INVENTION

Whatman Inc marketed a biological sample collection cellulous fibre paper which was treated with proprietary lysing and preserving chemicals. This paper, branded 'FTA' was latterly set in a cardboard frame for easier manipulation. This card, with and without chemical treatments and other copies have become a standard substrate onto which biological samples are transferred for later DNA amplification, if required and a colloquially referred to as DNA cards, or just cards. However, it will be appreciated that such 'cards' could be formed of other materials besides the common known cardboard construction, for example a collection substrate may be fibrous artificial fibres formed into a sheet and the outer frame (if needed) could be plastics. Forensic investigations are now commonplace at crime scenes and other large scale collection of biological materials are undertaken for example during disease or epigenetic studies or other collections of biological materials. Such collections generate many sample cards which need to be stored carefully. Often, DNA amplification is conducted at a specialist laboratory, where sample cards are sent, and they are only then put into storage magazines for automated processing. The cards may be used for other purposes, for example analysis of proteins or other analytes.

The priorities for such cards are that: they must not touch (important to maintain crime scene evidence integrity for example); they should be readily accessible for robotic arms or other automation devices; and they should be ventilated at least initially, or their liquid content reduced so that they can dry out for sustainable storage.

Magazines are available commercial which largely fulfil the above needs, based on open topped holders which have interior slotted walls. However, their design is not completely reliable, in relation to robotic handling, where mis-feeds of the sample cards are known, leading to cards being forced into the wrong slot. To some degree this problem is exacerbated by cards being sent in the post, which become bent, twisted or dog-eared' and so they do not sit well in a magazine slot. Mis-feeds could result in the integrity of DNA evidence being questioned where there is the chance that one card touches another. The inventors have devised a magazine for holding plural flat, possibly imperfect, cards which addresses the points above.

SUMMARY OF THE INVENTION

This disclosure describes a magazine for holding plural flat cards and the like in a generally parallel manner so that they cannot touch, so that there is space between them and so that they can be readily inserted and removed from the magazine by robotic means or by other automated means, even if the cards are imperfect.

Embodiments of the invention provide a magazine for holding plural generally flat sample collection cards in spaced parallel relation at their edges only, the magazine open at its top and including upstanding opposed side walls, each wall further including plural opposed pairs of inwardly extending wall ribs, spaced along each wall to provide therebetween card accepting slots, a first slot dimension (W) being defined by the spacing between an interior face of each wall, the magazine being characterised in that the walls at the top of each slot are tapered outwardly such that the first dimension (W) is greatest at the top of the slot.

The invention seeks to improve the insertablity and removeablity of cards used with the magazine claimed, for example by the inclusion of card support pieces which guide the cards into and out of the magazine in use. Other aspects of the invention are set out in the claims and are described below.

The invention extends to any combination of features disclosed herein, whether or not such a combination is mentioned explicitly herein. Further, where two or more features are mentioned in combination, it is intended that such features may be claimed separately without extending the scope of the invention.

BRIEF DESCRIPTION OF THE DRAWINGS

The invention can be put into effect in numerous ways, illustrative embodiments of which are described below with reference to the drawings, wherein:

FIGS. 2 and 3 are enlarged details of the magazine illustrated in FIG. 1.

Figure 1:
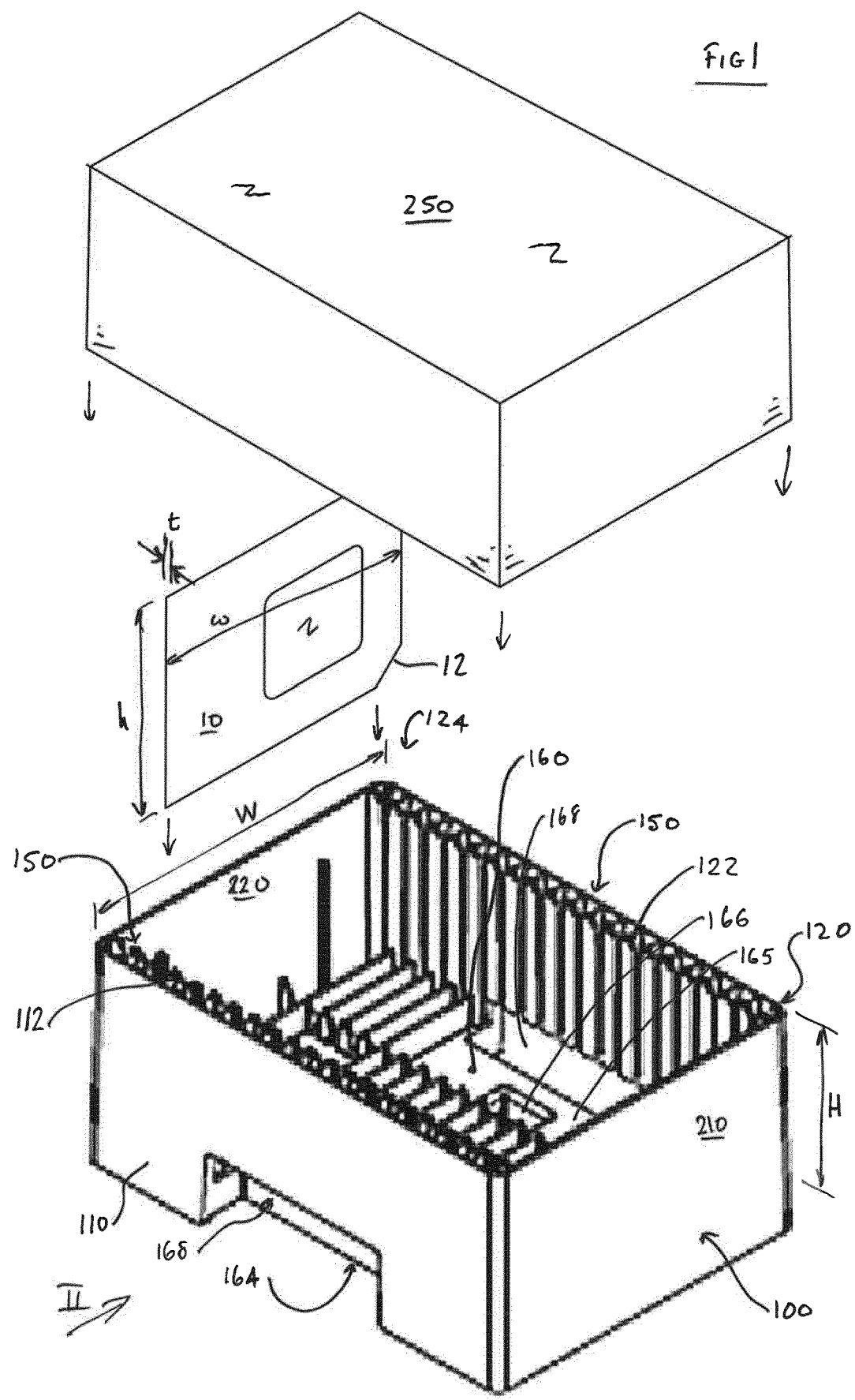
FIG. 1 shows a pictorial view of a magazine, and sample storage card and a magazine lid.

The invention, together with its objects and the advantages thereof, may be understood better by reference to the following description taken in conjunction with the accompanying drawings. Referring to the Figures, a moulded plastics card storage magazine 100 is showing in isometric projection in FIG. 1. The magazine 100 is suitable for holding twenty or so roughly credit card size generally flat biological sample collection substrates 10, only one of which is illustrated for clarity, and herein referred to as cards for convenience, in spaced parallel relation, in multiple slots 150 as defined below, held only at their edges for easier insertion and removal. The magazine is open at its top 124 and includes upstanding opposed side walls 110,120, and end walls 210,220 as well as a base 160 raised above the bottom of the magazine so that a recess 164 is formed under the base. The open top may be covered with a transparent moulded plastics lid 250, to inhibit contamination of the cards 10 during storage. The side and end walls have outer dimensions which taper upwardly, and the lid 250 is shaped to fit over the tapering walls to cover at least a substantial portion of the side and end walls and has tapering inner dimensions which are complementary to the tapering outer dimensions of the walls.

Referring additionally to FIG. 2, there is shown an enlarged view of the top edge of the side wall 120 viewed in the direction of arrow II in FIG. 1. The side wall 120 has inwardly extending wall ribs 122 spaced along the wall 120 to provide therebetween card accepting slots 150. The side wall 110 has a mirror image set of ribs 112 (FIG. 1), and thereby a first slot dimension W is defined by the spacing between an interior face 154 of each side wall, and bounded by adjacent ribs 122. The lid 250 may have features (not shown) which allow stacking of the magazine on top of another lid 250.

The wall ribs 122 each have a cross piece 130 extending generally in the same direction as the wall 120, wherein, adjacent ends 134 of neighbouring cross pieces are spaced to define a gap which gap defines a second slot dimension T, into which the cards 10 will slide in use. The wall 110 has a minor image arrangement for accommodating the other side of the cards 10. To make the entry and egress of the cards easier, particularly if the cards are not straight, the cross pieces 130 have a narrower upper end 132 such that the second dimension (T) is enlarged at the top of the slot 150. In addition, the walls 110 and 120 at the top 152 of each slot 150 are tapered outwardly such that the first dimension W is greatest at the top of the slot 150. Such a tapering could be achieved by flaring outwardly the top of the side walls 110 and 120, but it is preferred that the side walls have a thickness (D, FIG. 2)) which tapers toward the top 152 of the walls, to provide said enlarged first dimension W. The thinning of the walls allows a straight or linear outer wall which can more snuggly accommodate the lid 250 compared to a flared wall. With the enlarged entry to the slot 150, even if the card is not inserted with perfect orientation, the magazine with this slot entry has been found to be forgiving, such that the card will be forced into the correct orientation during automatic insertion, where a card gripper holds the card lightly such that the card can move relative to the gripper if urged by an external force such as encountered when the card edge abuts the enlarged slot entry of the type described above.

FIG. 3 shows the bottom of the slot 150. To inhibit jamming of the card 10 in the magazine 100, the bottom of the slot 150 is arranged in a novel way also. The arrangement on the opposing side with respect to wall 110 will be a mirror image of that described below. From FIG. 3 it can be seen that the side wall 120 is connected to the base 160 and the wall ribs 122 and cross pieces 130 extend down to the base 160 to provide generally parallel slots 150 of a depth (H see FIG. 1) with generally constant dimensions (W, T) apart from said enlarged top dimensions described above. In order that the cards 10 are held in place with the minimum of contact with the magazine, as well as the ends of cross pieces 130, there are provided additional base ribs 170 extending in the same plane as the wall ribs 130 which ribs support further base cross pieces 190, wherein, adjacent ends 194 of neighbouring base cross pieces 190 are spaced to define a gap which gap further defines the second slot dimension T at the base 160 of the magazine. The second dimension T at the base being about equal to the second dimension T defined by the neighbouring ends 134 of the cross pieces 130 of the wall ribs 122. The top of the base cross pieces 192 are narrowed so that the adjacent edges 194 act to guide a lower edge of the card into place in the slot defined by the edges 194 of the cross pieces 190. So even if a card is bent in the W dimension plane, the one two or more base cross pieces can guide the card into place in use.

To reduce card contact further, and thereby reduce sliding contact forces further, the ends 134 and 194 are rounded so that only line friction contact is made between the cards of the edges 134 and 194. That contact would increase to planar face contact if the edges were not rounded.

In order to support the base cross pieces the ribs 170 can extend continuously from one wall 120 to the opposing wall 110, as shown by the chain dotted lines in FIG. 3, or they may extend only partially across the magazine's width as shown by the continuous lines of FIG. 3.

The recess 164 of the base 160 can optionally be formed with formations 166 for locating the magazine relative to complimentary location formations of a complimentary robotic or automated handling device. The magazine can also optionally be stackable onto another similar magazine. The magazine side walls 110 and 120 may have air circulation apertures 168 to aid drying of the sample collection cards 10. In the recess 164 or in the lid 250 can be housed a compartment 165 for desiccant or like moisture absorbent material to aid drying of the cards. In that case, the apertures 168 may be omitted.

Cards of a size of around 84 mm (w—FIG. 1) by 46 mm (h) and of a thickness of about 1 to 1.5 mm overall thickness (t) are envisaged. Suitable corresponding dimensions for W, H and T are about W=88 mm; H=46 mm; and T=1.8-2 mm. Scaled for different size cards, it is envisaged that the dimension W should be about 2-10% larger than the card, H should be about the same dimension as the card height h; and the slot T dimensions should be about 15-100% bigger than the card thickness t, or more precisely about 33% bigger for middle of tolerance dimensions. A side wall lead-in angle (X FIG. 2) of about 10 to 20 degrees, preferably 15 degrees, has been found to work well, and lead-in angles of about 30 to 45 degrees (Y FIGS. 2 and 3) work well for the cross pieces.

In a refinement, the cards 10 may include a missing section, for example missing corner 12 in FIG. 1, which missing section prevents the card from being oriented wrongly in the magazine 100 because the magazine will include a complementary portion, in this example a partition extending between the side wall 120 and the base 160 corresponding to the position of the missing corner 12. Whilst an opaque colour magazine 100 is envisaged, in some applications it is advantageous to have a transparent plastics magazine, for example so that the contents of the magazine are more visible in use. Contrarily, the transparent lid 250 may advantageously be opaque for example to protect samples on the cards from degradation from UV light, for example UV light in sunlight.

Magazines may include identification in the form of indicia, a bar code, an RFID tag or similar wireless identification.

The invention claimed is:

1. A magazine for holding plural generally flat sample collection cards in spaced parallel relation at their edges only, the magazine open at its top, the magazine comprising:
   upstanding opposed side walls (110,120), each side wall further including plural opposed pairs of inwardly extending wall ribs spaced along each side wall to provide therebetween card accepting slots, a first slot dimension being defined by the spacing between an interior face of each side wall, wherein the side walls at the top of each slot are tapered outwardly such that the first slot dimension is greatest at the top of the slot,
   wherein each wall rib has a cross piece extending generally in the same direction as a respective side wall, and
   wherein adjacent ends of neighbouring cross pieces are spaced to define a gap which defines a second slot dimension, and
   wherein each cross piece has a narrowed upper end formed by opposing tapers on opposing end surfaces thereof such that the second slot dimension is enlarged at the top of the slot.

2. The magazine of claim 1, wherein the side walls have a thickness which tapers toward the top of the walls, to provide said enlarged first dimension.

3. The magazine of claim 2, wherein the side walls are connected to a base and the wall ribs and cross pieces extend to the base to provide a generally parallel slot of a depth with generally constant first and second slot dimensions apart from said enlarged top dimensions.

4. The magazine of claim 2 and at least one biological sample collection card (10), the or each card (10) being suitable for being held in the magazine for recovery by automated means, said card having a width (w) a height (h) and a thickness (t), which width, height or thickness correspond to respective dimensions (W, H, T) of the card accepting slot (150), such that the first dimension (W) of the slot is about 2 to 10% larger than the width (w) of the card; and/or the second dimension (T) of the slot is about 10 to 30% larger than the thickness (t) of the card; and/or the height (H) of the slot is about equal to or less than the height (h) of the card.

5. The magazine of claim 1, wherein the side walls are connected to a base and the wall ribs and cross pieces extend to the base to provide a generally parallel slot of a depth with generally constant first and second slot dimensions apart from said enlarged top dimensions.

6. The magazine of claim 5, wherein the base supports plural spaced base ribs upstanding from the base generally in the same plane as the wall ribs.

7. The magazine of claim 6, wherein each base rib includes one or more base cross pieces extending generally parallel to one of the walls wherein, adjacent ends of neighbouring base cross pieces are spaced to define a gap which further defines the second slot dimension at the base of the magazine, said second slot dimension at the base being about equal to the second slot dimension defined by the neighbouring ends of the cross pieces of the wall ribs, each base cross piece including an uppermost portion which is narrower than the remainder of the base cross piece in a direction perpendicular to the base ribs for guiding cards into the gap which defines the second slot dimension.

8. The magazine of claim 7 and at least one biological sample collection card, the or each card being suitable for being held in the magazine for recovery by automated means, said card having a width, a height and a thickness, which width, height or thickness correspond to respective dimensions of the card accepting slot, such that the first slot dimension is about 2 to 10% larger than the width of the card; and/or the second slot dimension of the slot is about 10 to 30% larger than the thickness of the card; and/or the height of the slot is about equal to or less than the height of the card.

9. The magazine of claim 7, wherein the uppermost portion of each base cross piece is formed by opposing tapers on opposing end surfaces thereof.

10. The magazine of claim 6, further including opposed end walls, wherein said base is positioned above the lowest portion of the walls to define a recess on its underside enclosed by the side and end walls, the recess including formations for locating the magazine relative to complimentary location formations of a complimentary robotic or automated handling device.

11. The magazine of claim 5, further including opposed end walls, wherein said base is positioned above the lowest portion of the end walls to define a recess on its underside enclosed by the side and end walls, the recess including formations for locating the magazine relative to complimentary location formations of a complimentary robotic or automated handling device.

12. The magazine of claim 11, wherein the side and end walls have outer dimensions which taper upwardly, the magazine further including a lid which is fittable over the side and end walls and in use covers at least a substantial portion of the side and end walls and has tapering inner dimensions which are complementary to the tapering outer dimensions of the side and end walls.

13. The magazine of claim 11, further including one or more air circulation apertures in each of the side walls which extend into the base.

14. The magazine of claim 11 and at least one biological sample collection card, the or each card being suitable for being held in the magazine for recovery by automated means, said card having a width, a height and a thickness, which width, height or thickness correspond to respective dimensions of the card accepting slot, such that the first slot dimension is about 2 to 10% larger than the width of the card; and/or the second slot dimension of the slot is about 10 to 30% larger than the thickness of the card; and/or the height of the slot is about equal to or less than the height of the card.

15. The magazine of claim 5, further including one or more air circulation apertures in each of the side walls which extend into the base.

16. The magazine of claim 1 and at least one biological sample collection card, the or each card being suitable for being held in the magazine for recovery by automated means, said card having a width, a height and a thickness, which width, height or thickness correspond to respective dimensions of the card accepting slot, such that the first slot dimension is about 2 to 10% larger than the width of the card; and/or the second slot dimension of the slot is about 10 to 30% larger than the thickness of the card; and/or the height of the slot is about equal to or less than the height of the card.

* * * * *